United States Patent [19]
Gerard et al.

[11] Patent Number: 6,112,253
[45] Date of Patent: Aug. 29, 2000

[54] OBJECT-ORIENTED METHOD MAINTENANCE MECHANISM THAT DOES NOT REQUIRE CESSATION OF THE COMPUTER SYSTEM OR ITS PROGRAMS

[75] Inventors: Scott Neal Gerard; Steven Lester Halter; Erik Edward Voldal, all of Rochester, Minn.

[73] Assignee: International Business Machines Corporation, Armonk, N.Y.

[21] Appl. No.: 08/542,147

[22] Filed: Oct. 12, 1995

[51] Int. Cl.[7] .................................................. G06F 9/44
[52] U.S. Cl. ............................................................ 709/315
[58] Field of Search ................................ 395/700, 712, 395/703, 683; 709/303, 203, 300

[56] References Cited

U.S. PATENT DOCUMENTS

| | | | |
|---|---|---|---|
| 4,558,413 | 12/1985 | Schmidt et al. | 364/300 |
| 4,809,170 | 2/1989 | Leblang et al. | 364/200 |
| 5,175,828 | 12/1992 | Hall et al. | 395/375 |
| 5,179,703 | 1/1993 | Evans | 395/700 |
| 5,327,562 | 7/1994 | Adcock | 395/700 |
| 5,339,430 | 8/1994 | Lundin et al. | 395/700 |
| 5,339,438 | 8/1994 | Conner et al. | 395/700 |
| 5,359,730 | 10/1994 | Marron | 395/650 |
| 5,410,703 | 4/1995 | Nilsson et al. | 395/700 |
| 5,493,682 | 2/1996 | Tyra et al. | 395/700 |
| 5,495,610 | 2/1996 | Shing et al. | 395/700 |
| 5,495,612 | 2/1996 | Hirayama et al. | 395/700 |
| 5,535,389 | 7/1996 | Elder et al. | 395/700 |
| 5,586,304 | 12/1996 | Stupek, Jr. et al. | 395/712 |
| 5,598,562 | 1/1997 | Culter et al. | 395/674 |
| 5,682,533 | 10/1997 | Siljestroemer | 395/616 |

FOREIGN PATENT DOCUMENTS

| | | |
|---|---|---|
| 04230530A | 8/1992 | Japan . |
| 06187134A | 7/1994 | Japan . |
| 06266563A | 9/1994 | Japan . |
| 07006106A | 1/1995 | Japan . |
| 072002779A | 8/1995 | Japan . |

OTHER PUBLICATIONS

S. S. Yau, et al, "An Object Oriented Approach to Software Design for Distributed Real–Time Computing Systems", IEEE ONDISC, pp. 297–303, 1993.

IBM, OS/2 2.0 Application Design Guide, pp. 7–4 to 7–12, Que, Mar. 1992.

"Concurrency within an Object", http://www2.hursley.ibm.com/orexx/getst6.htm.

C. Sibertin–Blanc, "Concurrency in CoOperative Objects", IEEE, pp. 35–44, 1997.

*Primary Examiner*—Majid A. Banankhah
*Assistant Examiner*—Sue Lao
*Attorney, Agent, or Firm*—Steven W. Roth

[57] ABSTRACT

The method maintenance mechanism of the present invention is comprised of two submechanisms, a method update mechanism and a method call manager. The method update mechanism is used to make changes to existing methods. The method call manger manages calls to methods in a way that allows active programs to continue to use old versions of methods while at the same time providing access to new method versions when programs are reactivated or activated for the first time.

6 Claims, 7 Drawing Sheets

OBJECT-ORIENTED METHOD MAINTENANCE MECHANISM THAT DOES NOT REQUIRE CESSATION OF THE COMPUTER SYSTEM OR ITS PROGRAMS

FIELD OF THE INVENTION

The present invention relates to data processing systems. More particularly, the present invention relates to maintaining object-oriented source code.

BACKGROUND OF THE INVENTION

The development of the EDVAC computer system of 1948 is often cited as the beginning of the computer era. Since that time, computer systems have found their way into just about every aspect of the American life style. One reason for this proliferation is the ability of computer systems to perform a variety of tasks in an efficient manner. The mechanisms used by computer systems to perform these tasks are called computer programs.

Like computer systems themselves, the development of computer programs has evolved over the years. The EDVAC system used what was called a "one address" computer programming language. This language allowed for only the most rudimentary computer programs. By the 1960s, improvements in computer programming languages led to computer programs that were so large and complex that it was difficult to manage and control their development and maintenance.

Therefore, the focus of the 1970's was on developing programming methodologies and environments that could better accommodate the increasing complexity and cost of large computer programs. One such methodology is called Object Oriented Programming (OOP). Though it has been some time since the fundamental notions of OOP were first developed, OOP systems are becoming more and more prevalent because it is felt that use of OOP can greatly increase the efficiency of computer programmers. Not surprisingly, objects are central to OOP technology. A single object represents an individual operation or a group of operations that are performed by a computer system upon information controlled by the object. Objects can be thought of as autonomous agents that work together to perform certain tasks. Sometimes entire computer programs are made up of groupings of objects and sometimes objects are simply accessed by more traditional computer programs to perform one specific task or subtask. Regardless of whether an object is accessed by another object or not, the accessed object is said to by a server object and the accessing entity is said to be a client of that object.

While the use of OOP has lead to greater programmer efficiency, that same use brings with it several challenges that have yet to be overcome by prior art mechanisms. One such challenge involves maintaining (i.e., updating and fixing) server objects in a way that does not cause problems with clients that have a current need for access to the server object or objects that are to be maintained. Existing object maintenance mechanisms avoid these problems by stopping the computer system or by deactivating the specific programs that are using the objects that require maintenance. A system or program is said to be quiesced when it has been made inactive. Of course, it is easy to see that it is undesirable to be forced to stop any level of system activity to perform what may be only minor maintenance. This is especially so in the banking and financial world where businesses constantly depend on minute to minute access to their computer systems.

Without a mechanism that can perform object maintenance without requiring system or program down-time, commercial computer users will never by able to fully capitalize on the benefits of object-oriented technology.

SUMMARY OF THE INVENTION

It is, therefore, a principal object of this invention to provide an enhanced object-oriented method maintenance mechanism that is capable of updating and fixing objects without first requiring the computer system or any of its programs to be quiesced.

It is another object of this invention to provide an enhanced object-oriented maintenance mechanism that allows executing programs to continue to execute using old version(s) of objects until they have fully completed their processing.

It is still another object of this invention to provide an enhanced object-oriented maintenance mechanism that gives programs access to new object version(s) even though they were accessing old object version(s) of those same objects when the new object version(s) became available.

It is yet another object of this invention to provide an enhanced object-oriented maintenance mechanism that allows programs to share a server object's data while nevertheless allowing those same programs to utilize different versions of the server object's methods.

It is yet another object of this invention to provide an enhanced object-oriented maintenance mechanism that allows programs to share a server object's data while nevertheless allowing a subset of those same programs to utilize a new version of the server methods.

These and other objects of the present invention are accomplished by the enhanced object-oriented maintenance mechanism disclosed herein.

The method maintenance mechanism of the present invention is comprised of two submechanisms, a method update mechanism and a method call manager. The method update mechanism is used to make changes to (ic, enhance or fix) existing methods. Of importance is the fact that these changes are done without stopping the computer system or any of its programs.

The method call manger manages calls to methods in a way that allows active programs to continue to use old versions of methods while at the same time providing access to new method versions when programs are reactivated or activated for the first time. Stated another way, the method call manager of the present invention provides different clients with shared access to a server object's data while nevertheless allowing those same clients to use different versions of the server object's methods to accomplish that access.

DESCRIPTION OF THE PREFERRED EMBODIMENT

Object Oriented Technology—an Overview

As discussed in the Background section, objects can be thought of as autonomous agents that work together to perform the tasks required of the computer system. A single object represents an individual operation or a group of operations that are performed by a computer system upon information controlled by the object.

The operations of objects are called "methods" and the information controlled by objects is called "object data" or just "data." Objects are created (called "instantiated") as members of something called a "class." A class is used to define its members. Classes define the data that will be controlled by their member objects and the methods that their member objects will have to provide access to that data.

As discussed, when an object or program needs access to the data controlled by a second object, it is considered to be a client of the second object. To access the data controlled by the second object, one of the methods of the client object (i.e., a client method) or client program will call or invoke the second object to gain access to the data controlled by that object. One of the methods of the called object (i.e., a server method in this case) is then used to access and/or manipulate the data controlled by the called object (i.e., the server object).

Detailed Description

Figure 1:
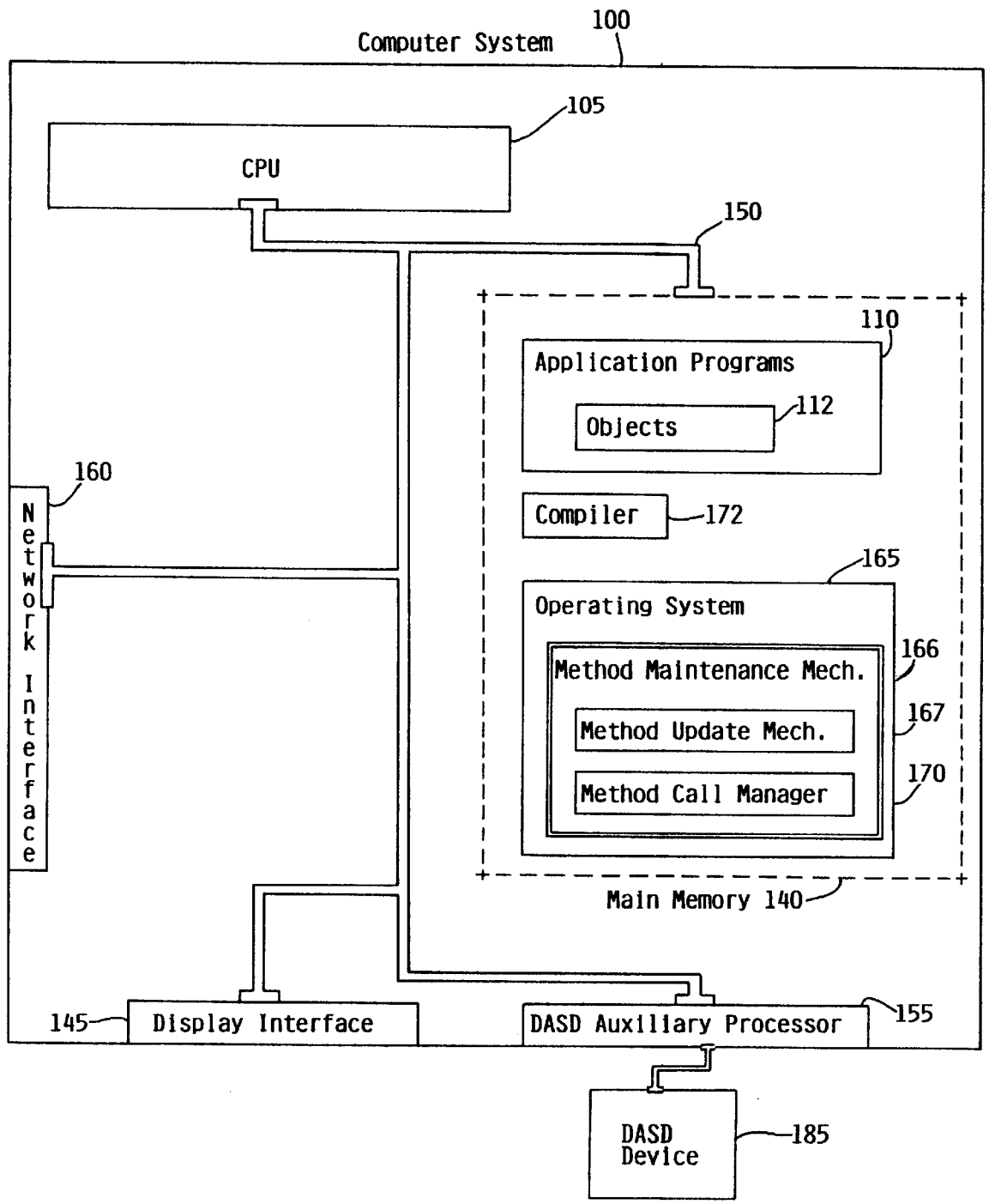
FIG. 1 is a block diagram of the computer system of the present invention.

FIG. 1 shows a block diagram of the computer system of the present invention. The computer system of the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 1, computer system 100 comprises main or central processing unit (CPU) 105 connected to main memory 140, terminal interface 145, mass storage interface 155, and network interface 160. These system components are interconnected through the use of system bus 150. Although computer system 100 is shown to contain only a single main CPU and a single system bus, it should be understood that the present invention applies equally to computer systems that have multiple CPUs and to computer systems that have multiple buses that each perform different functions in different ways.

The interfaces (called input/output processors in AS/400 terminology) that are used in the preferred embodiment each include separate, fully programmed microprocessors that are used to off-load compute-intensive processing from CPU 105. However, those skilled in the art will appreciate that the present invention applies equally to computer systems that simply use I/O adapters to perform similar functions. Terminal interface 145 is used to directly connect one or more terminals to computer system 100. These terminals, which may be non-intelligent or fully programmable workstations, are used to allow system administrators and computer programmers to communicate with computer system 100. Network interface 160 is used to connect other computer systems and/or workstations to computer system 100 in networked fashion. The present invention is not limited to any one networking mechanism. Computer system 100 may be connected to other systems through the use of present-day analog and/or digital techniques or via some networking mechanism of the future.

Mass storage interface 155 is used to connect mass storage devices, such as DASD device 185, to computer system 100.

Main memory 140 contains application programs 110, compiler 172, and operating system 165. While application programs 110 and operating system 165 are shown to reside in main memory 140, those skilled in the art will recognize that these entities are shown in this manner to represent the fact that programs are typically loaded from slower mass storage into faster main memory to execute. Depicting these programs in this manner should not be taken to mean that they are necessarily all completely contained in main memory 140 at the same time. It should also be noted that the term computer system memory is used herein to generically refer to the memory of the computer system as a whole (i.e. main memory 140 and that represented by DASD device 185). Those skilled in the ail will further recognize that the programs shown in main memory 140 need not necessarily all reside on computer system 100. For example, one or more programs of application programs 110 may reside on another system and engage in cooperative processing with one or more programs that reside on computer system 100. This could be accomplished through use of one of the well known client-server mechanisms such as remote procedure call (RPC).

Application programs 110 are further shown to contain objects 112. Objects 112 each may contain data and at least one method, which are not shown. As previously stated, a client method must call a server method to gain access to or otherwise manipulate the information controlled by the called object. It should be noted that a statement of a method being a client or a server method is one of relativity. In other words, a method that is said to be a client method relative to a second method may well be a server method relative to yet a third method. It should also be noted that application programs 110 contain non-object-oriented programs that nevertheless have access to objects 112. Further, use of the term client program should be taken to generically refer to a client method or non-object-oriented client program. It should be noted, though, that in the above-described client-server environment, the client program (as used herein) would be the mechanism on the server computer system that handles incoming requests from the client computer system, not the programs that are generating the requests while executing on the client computer system.

Compiler 172 is used to compile source code into executable code, as will be explained in the forth coming paragraphs.

Operating system 165 is a multitasking operating system known in the industry as OS/400; however, those skilled in the art will appreciate that the spirit and scope of the present invention is not limited to any one operating system. Operating system 165 is further shown to contain method maintenance mechanism 166, which itself contains method update mechanism 167 and method call manger 170. Method update mechanism 167 is used to fix and or update methods of objects 112. Method update mechanism 167, which is described in greater detail in the text associated with FIG. 2, does not stop computer system 100 or deactivate any of application programs 110 when making changes to objects 112. Method call manager 170 is used to allow executing programs to continue to execute using old versions of objects 112 while nevertheless giving those same executing programs access to new versions of objects after their processing has completed.

It is important to note that while the present invention has been (and will continue to be) described in the context of a fully functional computer system, those skilled in the art will appreciate that the present invention is capable of being distributed as a program product via floppy disk, CD ROM, or other form of recordable media or via any type of electronic transmission mechanism.

Figure 2:
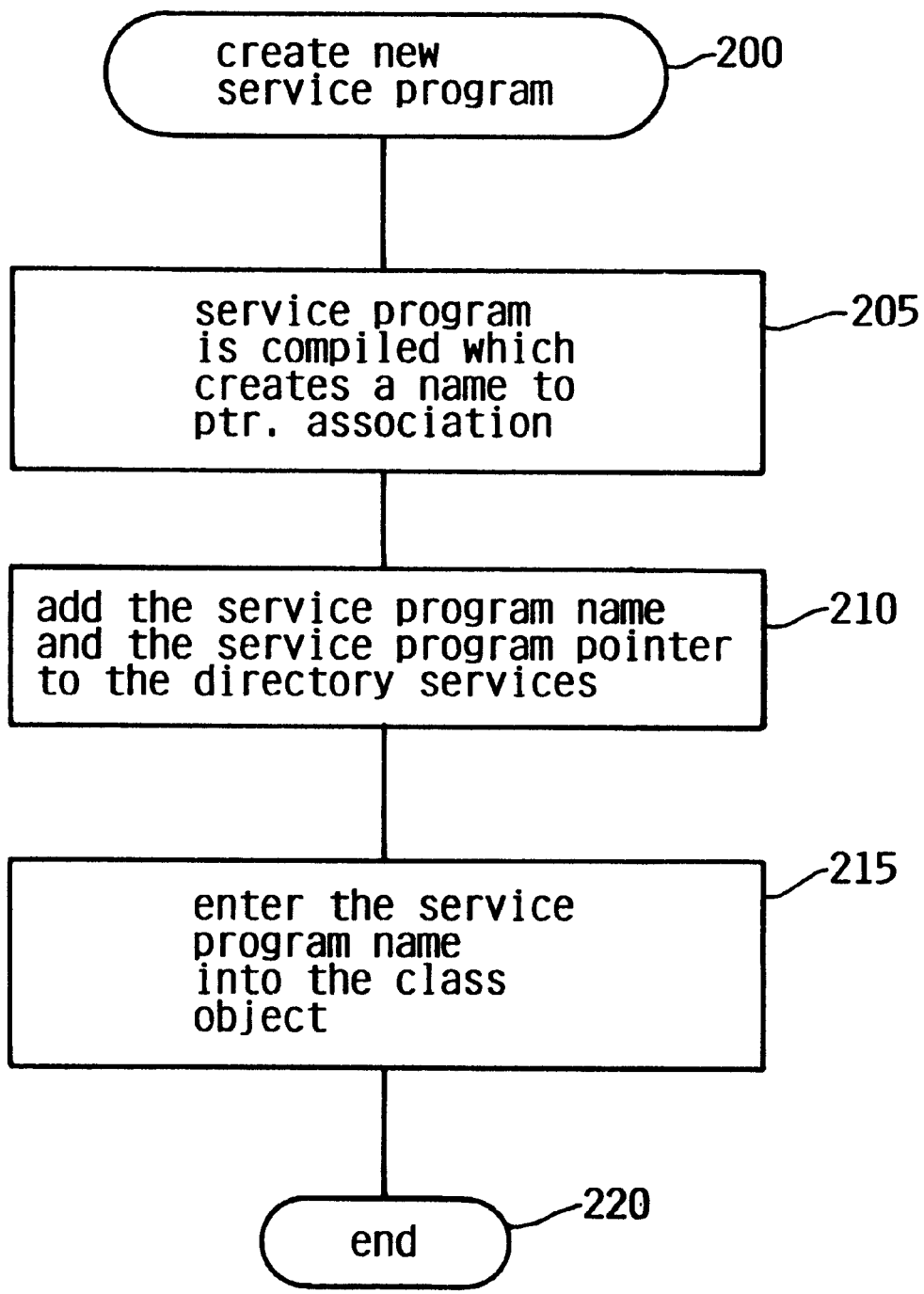
FIG. 2 is a flow diagram that shows steps used to carry out the method update mechanism of the present invention, according to the preferred embodiment.

FIG. 2 is a flow diagram of method update mechanism 167. In block 200, a new service program is created for computer system 100. The term "service program" is a specific use of AS/400 terminology. A service program contains the actual program instructions that are executed on CPU 105 to carry out the task or subtask that is assigned to each method of a particular class. Those skilled in the art will recognize that the concept of an AS/400 service program is well known in the art, although it may be described using different terminology (eg., a Unix library or as an OS/2 dynamic link library).

The initial creation of a service program can be accomplished through use of any of the well known source code editors or generators. Once the service program is created, method update mechanism 167 causes the new service program to be compiled in block 205 by compiler 172. As is well known in the art, compiling a source code version of a service program causes an object code representation of the service program to be created. This step implicitly creates a program name to computer system memory location association. Once the service program has been compiled, compiler 172 adds the service program name and pointer to the directory services of computer system 100 [block 210]. Directory services are responsible for understanding the computer system memory location for all of the programs (i.e., application programs and service programs alike) of computer system 100 and for returning the correct memory location when presented with a program name. Once the service program name and pointer have been added to directory services, method update mechanism 167 updates the class object with the name of the new service program [block 215]. Once the class object has been updated to include the new service program, it is available for use by client programs. The importance of this latter step will be explained in the text associated with FIGS. 3A through 3D. The reader should note here that method update mechanism 167 does not stop computer system 100 or any of its processes when adding the new service program.

Figures 1, 3A:
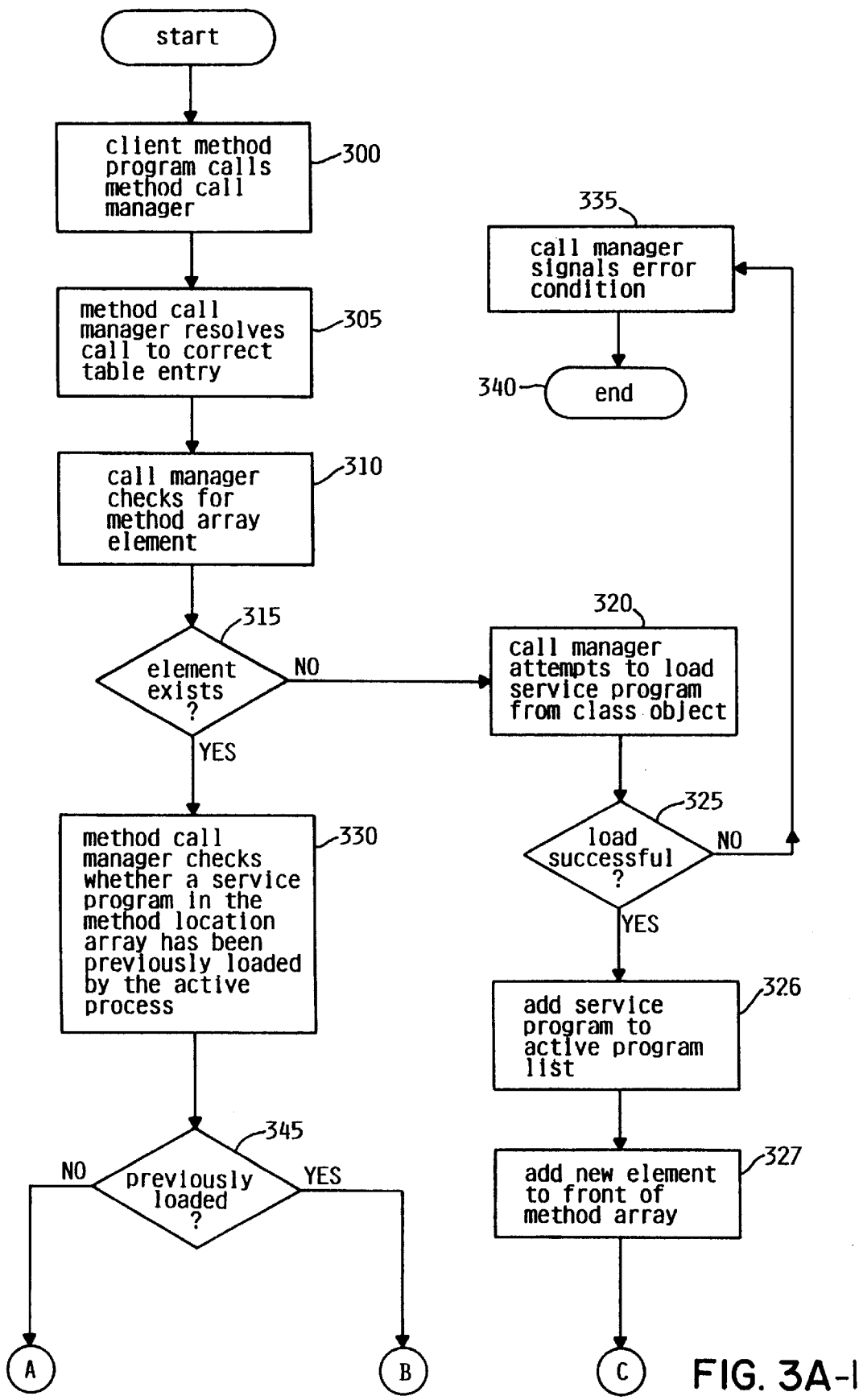
FIG. 3A is a flow diagram that shows steps used to carry out the method call manager of the present invention, according to the preferred embodiment.
Figures 2, 3A:
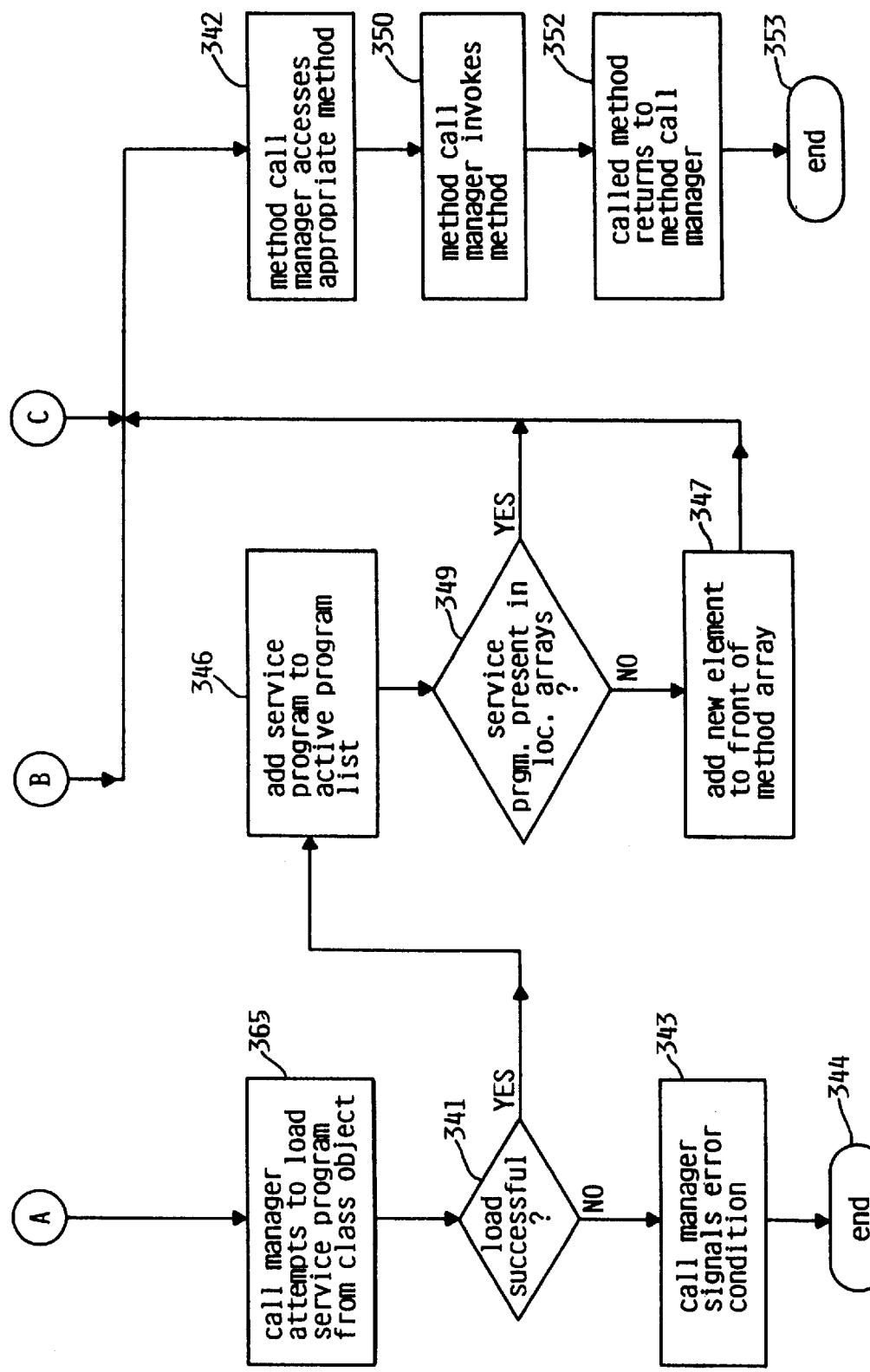

FIG. 3A is a flow diagram of method call manager 170. At the outset, it is important to note that method call manager 170 is a supervisory mechanism that is not found in prior art object-oriented mechanisms. Prior art server method call statements are compiled into instructions that cause the processor to simply execute the called server method. Unlike these prior art mechanisms, Compiler 172 of the present invention compiles method call statements into instructions that activate method call manager 170 and pass method call manager 170 the method signature of the server method that is to be called. Method call manager 170 is responsible for routing the call to the correct method. The placement of method call manager 170 in the method call path allows for the performance of administrative functions for method calls. One such function is method versioning, which is hereafter described.

Figure 3B:
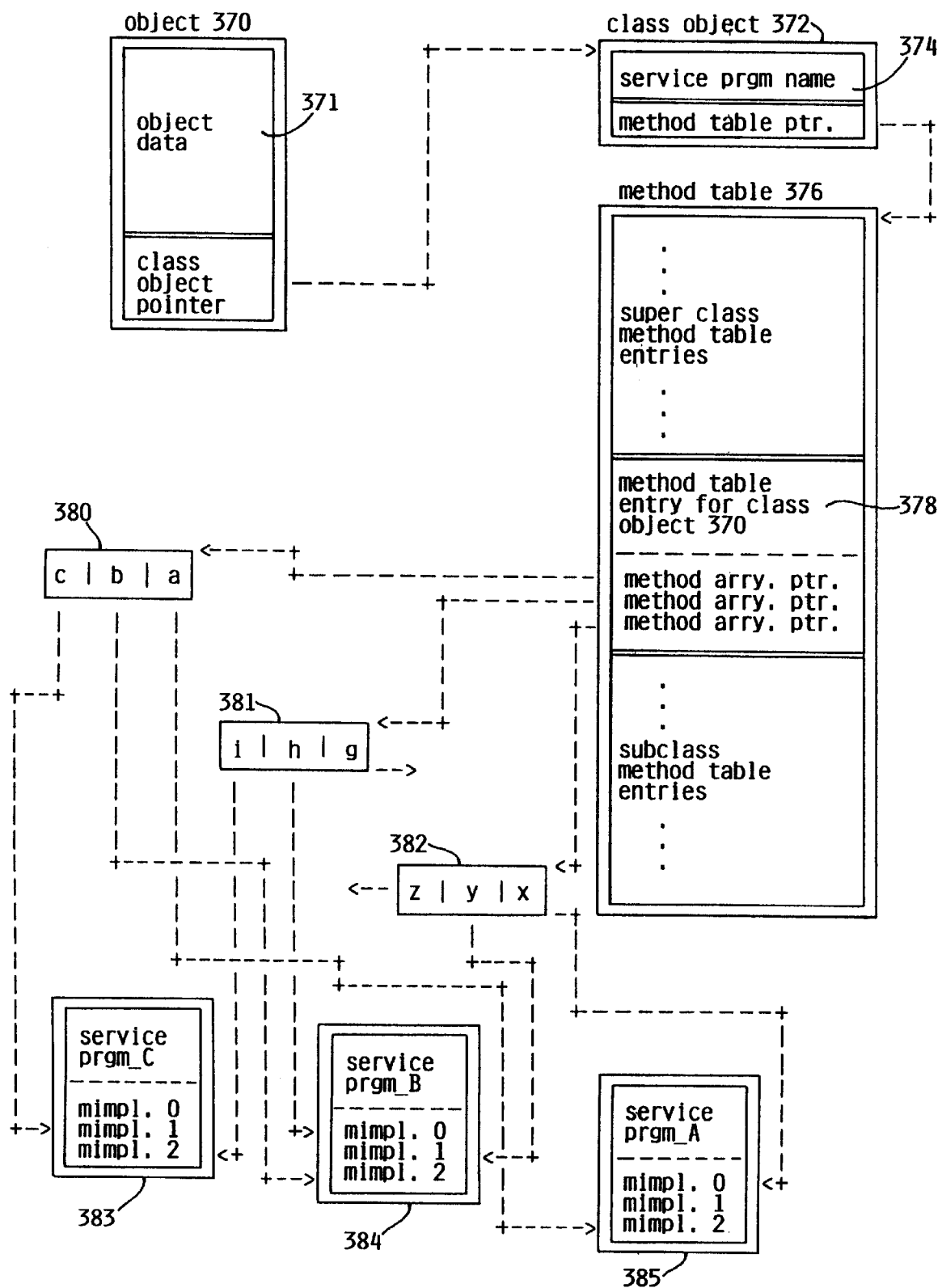
FIG. 3B is a block diagram of data structures used in the preferred embodiment.

In block 305, method call manager 170 resolves the call to the correct method table entry. FIG. 3B is a logical representation of how this occurs. Those interested in the exact details of the method resolution of the present invention should reference U.S. Pat. No. 5,404,525, which is hereby incorporated by reference. As a general example, assume here that a client method is making a call to a method of object 370. As shown on FIG. 3B, object 370 includes object data 371 and a class object pointer. Object 370 resides in that portion of main memory 140 known as shared memory. The concept of shared memory is well known to those skilled in the alt to mean that portion of main memory 140 that can be simultaneously accessed by more than one process at a time. Shared memory is the conceptual inverse of process local memory, which is that part of main memory 140 that is reserved for use by a single process.

Once invoked, method call manager 170 proceeds to resolve the name of the called method to the proper method table entry. Method call manager 170 does this by first using the class object pointer contained in object 370 to gain access to an operative portion of class object 372. (Readers interested in the exact details of class objects should refer to the above-identified patent.) From class object 372, method call manager 170 gains access to method table 376 and locates the correct entry (shown as entry 378). In block 310, method call manager 170 follows the method array pointer for the called method to the appropriate method location array (see method location arrays 380, 381, and 382 of FIG. 3B). Each method location array will usually contain at least one array element. However, if the method at issue has not yet been called (i.e., this is the first time), method call manager 170 will find an empty array at this stage of its processing. When this is the case, method call manager 170 attempts to load the service program associated with service program name 374 [block 320 of FIG. 3A]. Service program name 374 is contained in class object 380.

Service programs contain the actual executable code for all of the methods that have been defined and implemented for the subject class (i.e., those of class object 380 in this case). Service program name 374 contains the name of the most recent version of the service program for the class. If the load is unsuccessful, method call manager 170 issues an error signal [block 335] and then returns control to the calling method [block 340]. If the load of the service program is successful, method call manager proceeds to add the new service program to the active service programs list for the current process [block 326]. This latter step will be explained in greater detail in the text associated with FIG. 3D. Method call manager then proceeds to add a new element to the front of each of the method location arrays for the class (i.e., method location arrays 380, 381, and 382). Once this is accomplished, method call manager proceeds to access and invoke the appropriate method from the service program [blocks 342 and 350]. Method call manager 170 accomplishes these steps through access to information contained in each method location array element.

Figure 3C:
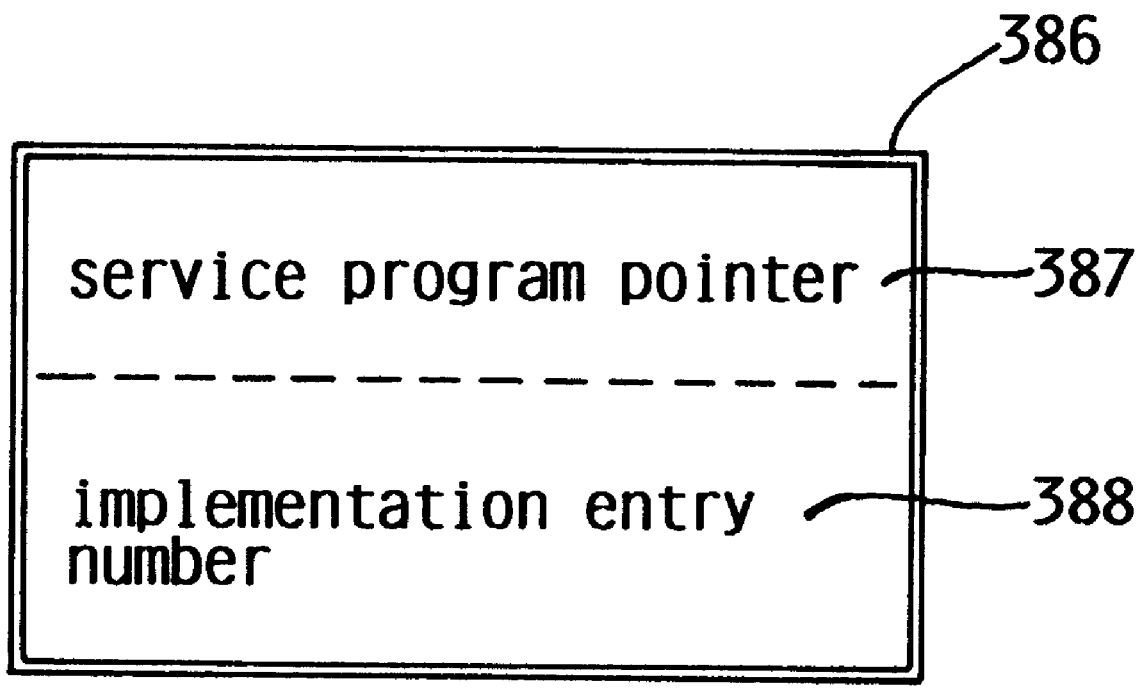
FIG. 3C is a block diagram of the method array element used in the preferred embodiment.

FIG. 3C shows the method location array element of the preferred embodiment in greater detail. Method array element 386 contains service program pointer 387 and implementation entry number 388. Implementation entry number 388 is an offset into the service program. Method call manager 170 then uses this pointer 387 and implementation entry number 388 to access and invoke the appropriate implementation of the method. While implementation number 388 is used in the preferred embodiment to allow method implementations to be located anywhere in a service program, the need the offset could be avoided as an alternative by simply enforcing some type of logical correspondence between the ordering of the method array pointers in the method table entry and the ordering of the method implementations within the service programs.

It is important to note here that the indirection between the method table entry and the executable code is a key aspect of the data sharing and method versioning capability of the present invention. The indirection allows for the inclusion of the method location arrays, which themselves allow for versioning. Those skilled in the art, however, will appreciate that the function provided by the indirection/array combination could be achieved through the use of alternative structure and that the present invention is not limited to the particular structure disclosed. After the method program has completed its processing, it returns control to method call manger 170 [block 352]. Method call manager 170 then proceeds to return control to the calling method (i.e., the client method) [block 353].

Returning now to block 315 of FIG. 3A, assume here that the method location array at issue does indeed contain at least one element. When this is the case, method call manager 170 checks to see whether one of the service programs identified in the method location array has been previously loaded by the active process [block 330]. On an AS/400 system, this is accomplished through access to a process list.

Figure 3D:
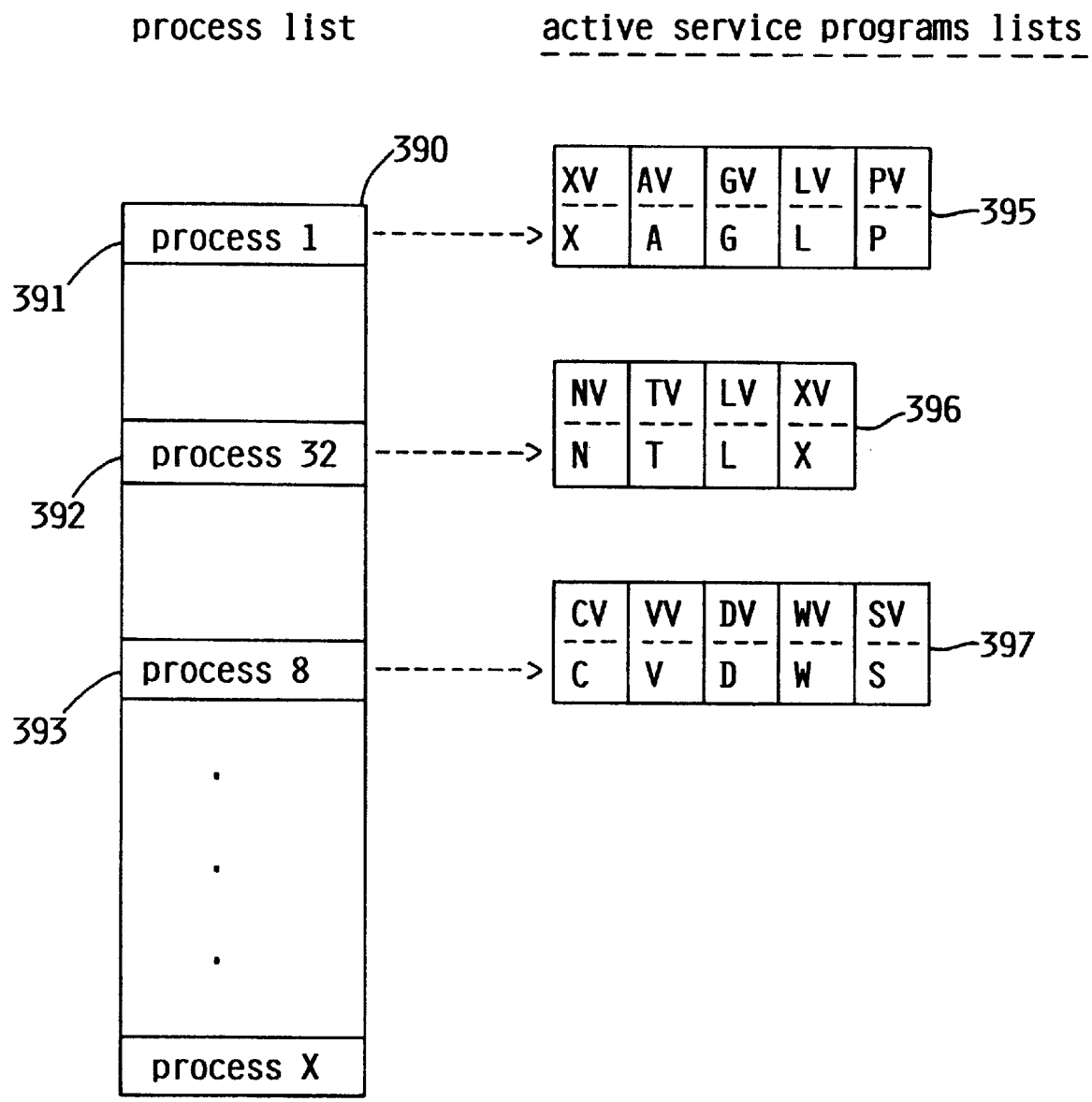
FIG. 3D is a block diagram of the active service program tracking mechanism that is used in the preferred embodiment.

FIG. 3D shows the process list of the preferred embodiment. Process list 390 is a list of the active processes on computer system 100. Each process list entry includes a pointer to an active service program list (see active program lists 395, 396, and 397).

Each of these lists sets forth the service programs that are active for the respective process. Each element of the list contains a pointer to a service program (i.e., the actual implementation of all of the methods for a specific class) and all of the variable values allocated by the particular activation of the service program that is executing as pail of the subject process. It should be noted here that while the focus of the present invention is on server methods and the presence of their service program within an active service program list, that client programs are also executing as part of the same process using the same or a different service program. It should also be noted that the word "activation" is specific AS/400 terminology that is used to describe a service program that has been loaded for execution as part of a process.

Those skilled in the art will appreciate that the concept of an AS/400 activation is well known in the art, although it may be described using different terminology (e.g., a loaded image or loaded dynamic link library).

As shown on FIG. 3D, process 1 and process 32 both have an activation of service program X. However, it should be noted each of these service program activations will have different values stored in the global variables (shown as the service program name followed by "V" for "variables") that have been defined by the method implementations within service program X. Those skilled in the art will appreciate that the handling of variable values is a fundamental method versioning problem that has been overcome by the present invention. A client program cannot simply be switched from one activation to another because variable values would likely be corrupted through changes to variable definitions. The present invention solves this problem by allowing a client program to continue to use the same method version (s) and the associated variable definitions until its process terminates naturally. By "naturally" we mean that the process completes its processing and stops such that it is no longer executing on the central processor or scheduled to execute on the central processor in the normal course. In other words, the process is allowed to complete without being stopped prematurely by some other process (e.g., prior art method maintenance mechanisms).

If one of the service programs identified in the method location array is also present in the active service programs list for the requesting process, method call manager 170 knows to access and invoke the method implementation within that service program [blocks 342 and 350]. If none of the service programs identified by the subject method location array are present in the active service programs list for the requesting process, method call manager 170 attempts to load a new service program [block 365] from service program name 374 [block 365 of FIG. 3A]. Method call manager 170 maps service program name 374 to a pointer to the subject service program through use of the directory services of computer system 100 (directory services is discussed in the text associated with FIG. 2).

If the load is unsuccessful, method call manager 170 issues an error signal [block 343] and then returns control to the calling method [block 344]. If the load of the service program is successful, method call manager 170 adds the new service program to the active service programs list for the current process [block 346]. Method call manager 170 then checks whether an element pointer to the newest service program is present in the method location array (i.e., whether any of the methods of the subject class have been invoked using the latest service program) [block 349]. If not, method call manager 170 adds a new element to the front of each of the method location arrays for the class (i.e., method location arrays 380, 381, and 382). Once this is accomplished, method call manager proceeds to access and invoke the appropriate method from the service program [blocks 342 and 350], as has been previously described.

As a more specific example, compare how method call manager 170 would handle a call from a program running under process 1 (see FIG. 3D) to how method call manager 170 would handle a call by a program running under process 32 (FIG. 3D). Assume that both client programs call the first method of object 370 (i.e., the method represented by method location array 380). As previously described each method makes its call by invoking method call manager 170 and passing method call manger 170 the method signature of the method to be called. This is shown in block 300 of FIG. 3A. In block 305, method call manager 170 resolves the call to the correct method table entry. In both cases of this example, the entry will be method table entry 378 of FIG. 3B.

In block 310, method call manager 170 will follow the method array pointer for first method of object 370 to the appropriate method location array (method location array 380 in this case). Method location array 380 contains three array elements, which means that three different versions of the called method have been previously called by clients. Therefore, block 315 will be answered affirmatively regardless of whether process 1 or process 32 is at issue. Method call manager 170 will next determine whether a service program in method location array 380 has been previously loaded by the active process [block 345]. As previously discussed, method call manager will make this determination through reference to process list 390 of FIG. 3D. In the case of process 1, method call manager 170 will determine that service program A has indeed been previously loaded. Therefore, method call manager 170 will use the information contained in element a of method location array 380 to access and invoke method implementation 2 of service program A (i.e., shown as service program 385 on FIG. 3B) [see blocks 342 and 350 of FIG. 3A]. While each service program is logically connected to each method location array (i.e., as shown on FIG. 3B), it should be also noted that each service program activation is also logically connected to its process (i.e., as shown on FIG. 3D).

In the case of process 32, however, method call manager 170 will ascertain that none of the array elements of method location array 380 contain location information about a service program that has been previously loaded by process 32. Accordingly, method call manager 170 will attempt to load a new service program [block 365] from service program name 374 [block 365 of FIG. 3A]. Assume here that the name contained in service program name 374 is that of service program C.

If the load is unsuccessful, method call manager 170 issues an error signal [block 343] and then returns control to the calling method [block 344]. Assume here, though, that the load of service program C is successful. Method call manager 170 then adds service program C to the active service programs list for process 32 [block 346]. Method call manager 170 then checks whether service program C is present in the method location arrays (i.e., whether any of the methods of the subject class have been invoked using service program C) [block 349]. As shown on FIG. 3B, service program C (i.e., service program 385) is present in the method location arrays. Accordingly, method call manager 170 will use the information contained in element c of method location array 380 to access and invoke method implementation 1 of service program C [see blocks 342 and 350 of FIG. 3A].

The reader should note here that the above example shows that two different processes (i.e., process 1 and process 32) can both share object data 371 of object 370 while nevertheless using two different versions of the same method (i.e., that of service programs A and C). The reader should also note that process 1 will automatically be given access to the latest method version (i.e., that of service program C in the example) after it naturally terminates execution (i.e., because service program A will be removed from active service program list 395).

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An apparatus, said apparatus comprising:

a processing unit;

computer system memory, said computer system memory being connected to said processing unit;

a first process, said first process executing on said processing unit under control of a multitasking operating system;

a client program, said client program executing on said processing unit as part of said first process;

at least one object, said at least one object being stored in said computer system memory, said at least one object having a method and data, said method being stored in said computer system memory for execution on said processing unit, said method having a first version, and a second version said first version of said method being currently used by said client program; and a method call manager, said method call manager routing calls that originate from said client program to said first version of said method until said first process terminates naturally and routing calls from said client program to said second version of said method when said client program is executing as part of a second process, such that said first version of said method and said second version of said method are sharing all of said data on behalf of said client program, said second process being started after said second version of said method program has been created.

2. A program product, said program product comprising:

a recordable media; and a method call manager recorded on said recordable media, said method call manager being used on an apparatus in which at least one object is stored in computer system memory, said at least one object having a method and data, said method being stored in said computer system memory for execution on a processing unit, said method having a first version and a second version, said first version of said method being created and made available for execution on said apparatus before said second version is created and made available for execution on said apparatus, said method call manager being used on said apparatus to route calls that originate from a client program to said first version of said method when said client program is executing on said processing unit as part of a first process and until said first process terminates naturally and said method call manager being used on said apparatus to route calls from said client program to said second version of said method when said client program is executing as pair of a second process, such that said first version of said method and said second version of said method are sharing all of said data on behalf of said client program, said second process being started after said second version of said method program has been created.

3. A method for transmitting a program product from a first apparatus to a second apparatus, said method comprising the steps of:

establishing a connection between said first apparatus and said second apparatus; and transmitting said program product from said first apparatus to said second apparatus, said program product comprising a method call manager, said method call manager being used on an apparatus in which at least one object is stored in computer system memory, said at least one object having a method and data, said method being stored in said computer system memory for execution on a processing unit, said method having a first version and a second version, said first version of said method being created and made available for execution on said apparatus before said second version is created and made available for execution on said computer system, said method call manager being used on said computer system to route calls that originate from a client program to said first version of said method when said client program is executing on said processing unit as part of a first process and until said first process terminates naturally and said method call manager being used on said computer system to route calls from said client program to said second version of said method when said client program is executing as part of a second process, such that said first version of said method and said second version of said method are sharing all of said data on behalf of said client program, said second process being started after said second version of said method program has been created.

4. An apparatus, said apparatus comprising:

a processing unit;

computer system memory, said computer system memory being connected to said processing unit;

a first process, said first process executing on said processing unit under control of a multitasking operating system;

a client program, said client program executing on said processing unit as part of said first process;

at least one object having data, said at least one object being stored in computer system memory, said at least one object having a method, said method being stored in said computer system memory for execution on said processing unit, said method having a first version and a second version; and a method call manager, said method call manager routing calls from a first client program to said first method version and routing calls from a second client program to said second method version such that both said first client program and said second client program are sharing all of said data.

5. A program product, said program product comprising:

a recordable media; and a method call manager recorded on said recordable media, said method call manager being used on a computer system in which at least one object is stored in computer system memory, said at least one object having data and a method, said method being stored in said computer system memory for execution on a processing unit, said method having a first version and a second version, said method call manager routing calls from a first client program to said first method version and routing calls from a second client program to said second method version such that both said first client program and said second client program are sharing all of said data.

6. A method for transmitting a program product from a first computer system to a second computer system said method comprising the steps of:

establishing a connection between said first computer system and said second computer system; and transmitting said program product from said first computer system to said second computer system, said program product comprising a method call manager, said method call manager being used on a computer system in which at least one object is stored in computer system memory, said at least one object having data and a method, said method being stored in said computer system memory for execution on a processing unit, said method having a first version and a second version, said method call manager routing calls from a first client program to said first method version and routing calls from a second client program to said second method version such that both said first client program and said second client program are sharing all of said data.

* * * * *

UNITED STATES PATENT AND TRADEMARK OFFICE
CERTIFICATE OF CORRECTION

PATENT NO. : 6,112,253
DATED : August 29, 2000
INVENTOR(S) : Scott Neal Gerard; Steven Lester Halter; Erik Edward Voldal It is certified that an error appears in the above-identified patent and that said Letters Patent is hereby corrected as shown below:

Claim 2, Col. 10, Line 27, "pair" should be --part--.

Claim 6, Col. 12, Line 7, after "second computer system", insert a comma.

Signed and Sealed this

Eighth Day of May, 2001

Attest:

NICHOLAS P. GODICI

Attesting Officer

Acting Director of the United States Patent and Trademark Office